United States Patent
Sainis et al.

(10) Patent No.: US 11,398,204 B2
(45) Date of Patent: Jul. 26, 2022

(54) ELECTRO-OPTIC DISPLAYS AND METHODS OF DRIVING THE SAME

(71) Applicant: E INK CORPORATION, Billerica, MA (US)

(72) Inventors: Sunil Krishna Sainis, Melrose, MA (US); Teck Ping Sim, Acton, MA (US); Richard J. Paolini, Jr., Framingham, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 17/244,352

(22) Filed: Apr. 29, 2021

(65) Prior Publication Data
US 2021/0248972 A1    Aug. 12, 2021

Related U.S. Application Data

(63) Continuation of application No. 16/822,301, filed on Mar. 18, 2020, now Pat. No. 11,030,969.
(Continued)

(51) Int. Cl.
*G09G 3/36* (2006.01)
*G02F 1/1343* (2006.01)
(Continued)

(52) U.S. Cl.
CPC ......... *G09G 3/3696* (2013.01); *G02F 1/1339* (2013.01); *G02F 1/13439* (2013.01); *G09G 3/344* (2013.01)

(58) Field of Classification Search
CPC ........ G09G 3/3696; G09G 3/344; G09G 3/00; G02F 1/1334; G02F 1/1339;
(Continued)

(56) References Cited

U.S. PATENT DOCUMENTS 5,502,490 A * 3/1996 Takanashi ............ H04N 9/3129
                                                              358/296
5,528,399 A    6/1996 Izumi
(Continued)

FOREIGN PATENT DOCUMENTS

JP    2014016424 A    1/2014

OTHER PUBLICATIONS

Wood, D., "An Electrochromic Renaissance?" Information Display, 18(3), 24 (Mar. 2002).
(Continued)

*Primary Examiner* — Tom V Sheng
(74) *Attorney, Agent, or Firm* — Jason P. Colangelo (57) ABSTRACT

An electro-optic display comprising, in order: a light-transmissive layer of conductive material; a layer of bistable electro-optic medium; a layer of light-shielding material; a plurality of pixel electrodes; a layer of photoconductive material; and one or more light emitters. In one exemplary embodiment, the layer of photoconductive material is adapted to bridge a gap between an address line and at least one of the pixel electrodes when the photoconductive material is in a low impedance state. In another, non-exclusive embodiment, the electro-optic display further comprises a second electrode layer between the layer of photoconductive material and the one or more light emitters and a driver adapted to apply voltage between the light-transmissive layer of conductive material and the second electrode layer.

11 Claims, 8 Drawing Sheets

Related U.S. Application Data (60) Provisional application No. 62/825,845, filed on Mar. 29, 2019.

(51) Int. Cl.
  *G02F 1/1339* (2006.01)
  *G09G 3/34* (2006.01)

(58) Field of Classification Search
  CPC .... G02F 1/13439; G02F 1/135; G02F 1/1351;
  G02F 1/1354; G02F 1/1355
  USPC ......................................................... 345/204
  See application file for complete search history.

(56) References Cited

U.S. PATENT DOCUMENTS

| | | | |
|---|---|---|---|
| 5,684,368 | A * | 11/1997 | Wei ..................... G09G 3/3216 |
| | | | 315/169.3 |
| 5,760,761 | A | 6/1998 | Sheridon |
| 5,777,782 | A | 7/1998 | Sheridon |
| 5,808,783 | A | 9/1998 | Crowley |
| 6,054,071 | A | 4/2000 | Mikkelsen, Jr. |
| 6,055,091 | A | 4/2000 | Sheridon |
| 6,097,531 | A | 8/2000 | Sheridon |
| 6,128,124 | A | 10/2000 | Silverman |
| 6,137,467 | A | 10/2000 | Sheridon |
| 6,147,791 | A | 11/2000 | Sheridon |
| 6,241,921 | B1 | 6/2001 | Jacobson et al. |
| 6,301,038 | B1 | 10/2001 | Fitzmaurice |
| 6,866,760 | B2 | 3/2005 | Paolini, Jr. et al. |
| 6,870,657 | B1 | 3/2005 | Fitzmaurice |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 6,982,819 | B2 | 1/2006 | Sawin et al. |
| 7,002,728 | B2 | 2/2006 | Pullen et al. |
| 7,012,600 | B2 | 3/2006 | Zehner et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,148,867 | B2 | 12/2006 | Izumi |
| 7,170,670 | B2 | 1/2007 | Webber |
| 7,312,784 | B2 | 12/2007 | Baucom et al. |
| 7,339,715 | B2 | 3/2008 | Webber et al. |
| 7,411,719 | B2 | 8/2008 | Paolini, Jr. et al. |
| 7,453,445 | B2 | 11/2008 | Amundson |
| 7,465,208 | B2 | 12/2008 | Hiji et al. |
| 7,535,624 | B2 | 5/2009 | Amundson et al. |
| 7,561,324 | B2 | 7/2009 | Duthaler et al. |
| 7,679,814 | B2 | 3/2010 | Paolini, Jr. et al. |
| 7,715,088 | B2 | 5/2010 | Liang et al. |
| 7,839,564 | B2 | 11/2010 | Whitesides et al. |
| 8,009,348 | B2 | 8/2011 | Zehner et al. |
| 8,357,282 | B2 | 1/2013 | Lau |
| 8,384,633 | B2 | 2/2013 | Yamaguchi et al. |
| 8,642,363 | B2 | 2/2014 | Lau et al. |
| 8,963,812 | B2 | 2/2015 | Hu et al. |
| 9,279,906 | B2 | 3/2016 | Kang |
| 9,799,713 | B2 | 10/2017 | Choi et al. |
| 10,444,553 | B2 | 10/2019 | Laxton |
| 2003/0011868 | A1 * | 1/2003 | Zehner ................. B41J 3/4076 |
| | | | 359/296 |
| 2003/0076573 | A1 * | 4/2003 | Gates .................... G02F 1/1343 |
| | | | 359/245 |
| 2003/0179169 | A1 * | 9/2003 | Izumi .................... G02F 1/1345 |
| | | | 345/87 |
| 2004/0051101 | A1 * | 3/2004 | Hotta .................... H01L 27/127 |
| | | | 257/72 |
| 2012/0223875 | A1 * | 9/2012 | Lau ....................... H01L 27/156 |
| | | | 345/83 |
| 2015/0005720 | A1 | 1/2015 | Zang |
| 2016/0012710 | A1 | 1/2016 | Lu et al. |
| 2017/0025489 | A1 * | 1/2017 | Choi .................... H01L 27/3258 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 345-348, (Jun. 5, 2002).

Korean Intellectual Property Office, PCT/US2020/022606, International Search Report and Written Opinion, dated Jul. 8, 2020.

* cited by examiner

Figure 9B though for convenience the term "bistable" may be used herein to cover both bistable and multi-stable displays.

Large bistable reflective electro-optic displays are ideal for signage markets. Compared to emissive displays, such as LCDs, bistable reflective electro-optic displays consume less power and are easily viewed in the daylight. Unfortunately, for large area displays, such as billboards, there are significant costs associated with making novel backplanes and drivers for bistable reflective electro-optic displays. Accordingly, there is a need for lower-cost large area displays that utilize bistable electro-optic media.

ELECTRO-OPTIC DISPLAYS AND METHODS OF DRIVING THE SAME

STATEMENT OF RELATED APPLICATIONS

This application is a continuation of co-pending application Ser. No. 16/822,301, filed Mar. 18, 2020 (Publication No. 2020-0312266); which claims priority to U.S. Patent Application No. 62/825,845 filed on Mar. 29, 2019, the disclosures of which are incorporated by reference herein in their entireties.

BACKGROUND OF INVENTION

This invention relates to electro-optic displays. More specifically, in one aspect this invention relates to large area electro-optic displays comprising bi-stable electro-optic media, such as electrophoretic media.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, al-

SUMMARY OF THE INVENTION

In a first aspect, the present application provides an electro-optic display comprising, in order: a light-transmissive layer of conductive material; a layer of bistable electro-optic medium; a layer of light-shielding material; a plurality of electrodes; a layer of photoconductive material; and one or more light emitters. In one exemplary embodiment, the layer of photoconductive material is adapted to bridge a gap between an address line and at least one of the pixel electrodes when the photoconductive material is in a low impedance state. In a second, non-exclusive embodiment, the electro-optic display further comprises a second light-transmissive electrode layer between the layer of photoconductive material and the one or more light emitters and a driver adapted to apply voltage between the light-transmissive layer of conductive material and the second light-transmissive electrode layer. The second electrode layer may comprise a light-transmissive sheet and a layer of light-transmissive conductive material applied to the surface of the light-transmissive sheet in contact with the photoconductive material. The electro-optic display of the second embodiment may further comprise a light-shielding pattern between the one or more light emitters and the second light-transmissive electrode layer. The electro-optic display of this first aspect may further comprise a protective sheet, wherein the light-transmissive layer of conductive material is between the protective sheet and the layer of electro-optic medium. The electro-optic medium may be an encapsulated electrophoretic medium. In one embodiment, the encapsulated electrophoretic medium comprises a binder and a plurality of microcapsules, the microcapsules containing a dispersion of charged particles in a fluid. In another embodiment, the encapsulated electrophoretic medium comprises a plurality of sealed microcells containing a dispersion of charged particles in a fluid. In a further embodiment, the encapsulated electrophoretic medium comprises a discontinuous phase comprising a plurality of fluid droplets containing charged particles and a continuous phase comprising a polymeric material.

In a second aspect, the present application provides an electro-optic display comprising, in order: a light-transmissive layer of conductive material; a layer of bistable electro-optic medium; a layer of photoactivated transistors having gates masked with a material adapted to substantially block light transmitted through the light-transmissive layer and the layer of bistable electro-optic medium; and one or more light emitters. In one embodiment, the layer of photoactivated transistors is a TFT array.

These and other aspects of the present invention will be apparent in view of the following description.

BRIEF DESCRIPTION OF THE FIGURES

The drawing Figures depict one or more implementations in accord with the present concepts, by way of example only.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

In embodiments, the displays made according to the various embodiments of the present invention provide a large area bistable electro-optic display by incorporating a layer of photoconductive material within the display stack. The photoconductive material may be used to form an array of electrodes used to apply an electric field across an electro-optic medium or, alternatively, a layer of photoconductive material may be incorporated between two electrode layers used to apply the electric field.

Figure 1:
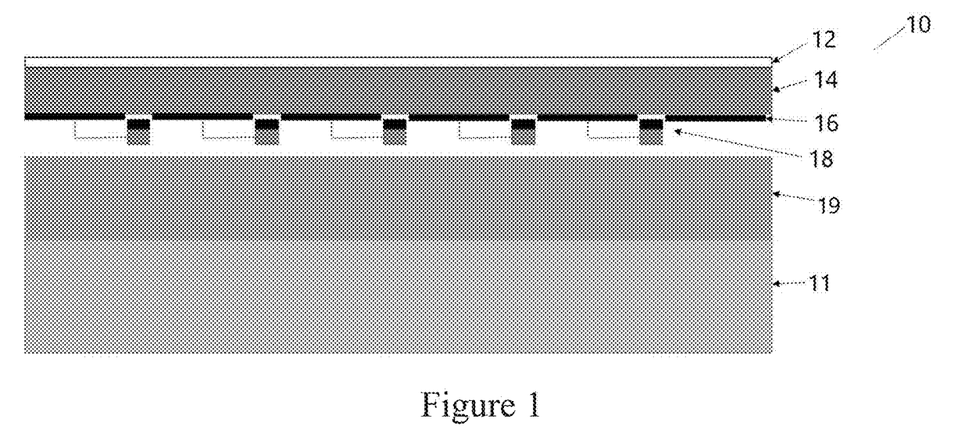
FIG. 1 is a schematic cross-sectional view of a display according to a first embodiment of the present invention.

Referring to the exemplary embodiment of FIG. 1, a reflective electro-optic display 10 is illustrated. The display 10 may include a top light-transmissive protective layer 12 through which the display images are viewed. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The protective layer 12 may include a continuous layer of conductive material to serve as a top electrode, such as a sheet of polyethylene terephthalate (PET) having a thin film of indium tin oxide (ITO) applied on the non-exposed surface of the PET sheet.

Below the light transmissive protective layer 12 is a layer of bistable electro-optic medium 14. Some bistable electro-optic materials may be solid in the sense that the materials have solid external surfaces, although the materials may, and often do, have internal liquid- or gas-filled spaces. Examples of bistable solid electro-optic materials include, but are not limited to, rotating bichromal member displays, electrochromic displays, electro-wetting displays, and encapsulated electrophoretic displays.

A rotating bichromal member type display, such as described, for example, in U.S. Pat. Nos. 5,808,783; 5,777,782; 5,760,761; 6,054,071 6,055,091; 6,097,531; 6,128,124; 6,137,467; and 6,147,791, uses a large number of small bodies (typically spherical or cylindrical) which have two or more sections with differing optical characteristics, and an internal dipole. Although this type of display is often referred to as a "rotating bichromal ball" display, the term "rotating bichromal member or bodies" is preferred as more accurate since in some of the patents mentioned above the rotating members are not spherical. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface.

A bistable electrochromic display uses, for example, an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media. Other types of electro-optic media may also be used in the displays of the present invention.

Returning to the embodiment of FIG. 1, electrode layer 16 is provided in the form on an active matrix (AM) array of independently addressable thin film transistor (TFT) photo-activated electrodes such as a transistor array made of hydrogenated amorphous silicon (a-Si:H). The transistor gates 18 have been masked with a material that is preferably able to block most if not all of the light transmitted from the viewer's side through the protective layer 12 and electro-optic medium 14 to prevent such light from causing uncontrolled switching of the electro-optic medium 14. The masking material may be, e.g., a metal coating.

A light-transmissive spacer 19, such as plastic or glass, couples the photoconductive array 18 to a light emitter 11. The light emitter 11 may be, for example, a light guide having a one or more light sources emitting light into an edge of the light guide. Alternatively, commercially available emissive devices, for example LCD displays, digital light processing (DLP) devices, organic light emitting diodes (OLED), or rastering/scanning lasers, or a movable single point light source that is projected onto one or more of the transistors within an array may serve the role of light emitter.

An electric field is not applied to the electro-optic medium 14 between an electrode of layer 16 and the continuous conductor of the top sheet 12 unless light is also transmitted onto the gate 18 from the light emitter 11. When the light is transmitted onto the gate 18 simultaneously with the addressing of the electrode 16, an electric field is applied to the electro-optic medium 14, switching its optical state, and thereby forming an image that is viewable through the light-transmissive top sheet 12. Because the electro-optic medium 14 is bistable, power supplied to the light emitter 11, electrodes 16, and continuous conductor in top sheet 12 is only required for the time period necessary to generate the image. Once generated, the image will remain after cutting the power supply.

Various aspects of the displays made according to the embodiments of the present invention may be optimized to improve the performance and reduce power consumption of the displays. For example, the wavelength and intensity of the light transmitted by the light emitter may be selected to ensure maximal photogeneration in the electro-optic medium, the light-transmissive spacer may be designed to preserve the intensity of light delivered to the photoconductive material (i.e. to prevent light loss), the light emitted by the light emitter may be limited to only those areas in which a change in optical state of the electro-optic medium is necessary to form a new image, and appropriate time periods and voltages applied to the display may be selected to ensure DC balancing.

Figure 2:
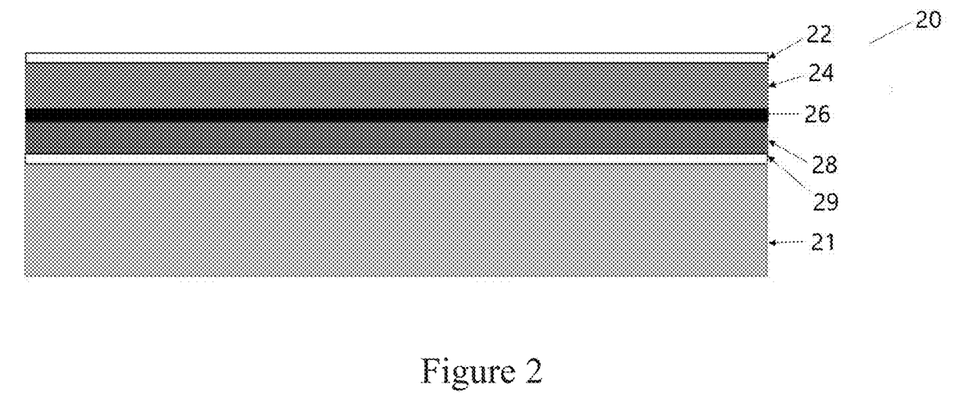
FIG. 2 is a schematic cross-sectional view of a display according to second embodiment of the present invention.

In FIG. 2, a display 20 made according to a second embodiment of the present invention is illustrated. Similar to the first embodiment, the display 20 comprises a light-transmissive top protective sheet 22 that includes a continuous electrode, a layer of electro-optic medium 24, a light shielding layer 26, and a light emitter 21. Below the light shielding layer 26 is a layer of photoconductive material 28 and a second electrode layer 29 between the photoconductive material 28 and the light emitter 21. Materials that may be used to form the layer of photoconductive material include, but are not limited to, germanium, gallium, selenium, doped silicon, metal oxides and sulfides, as well as organic photoconductors, e.g. Cu-phthalocyanine ("phthalocyanine blue"), and photoconductive polymers. The second electrode layer 29 may be similar to the top light-transmissive protective sheet in that it includes a light-transmissive material, such as PET, with a layer of conductive material, such as ITO, applied to the surface in contact with the photoconductive material. The ITO may be applied in a segmented pattern, wherein each segment is independently addressable. The light-transmissive material within the second electrode layer 29 serves to couple the light emitter 21 to the photoconductive material 28.

Figure 3A:
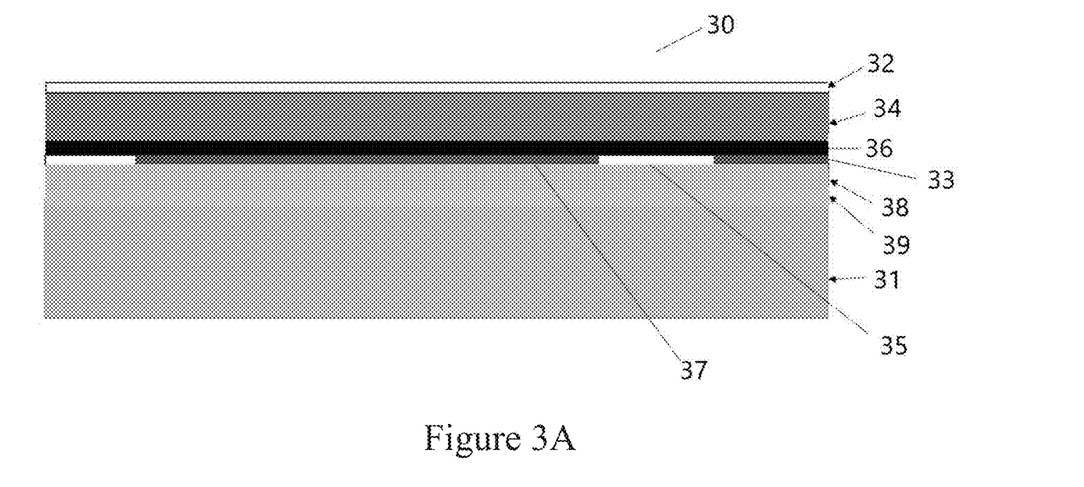
FIG. 3A is a schematic cross-sectional view of a display according to a third embodiment of the present invention.
Figure 3B:
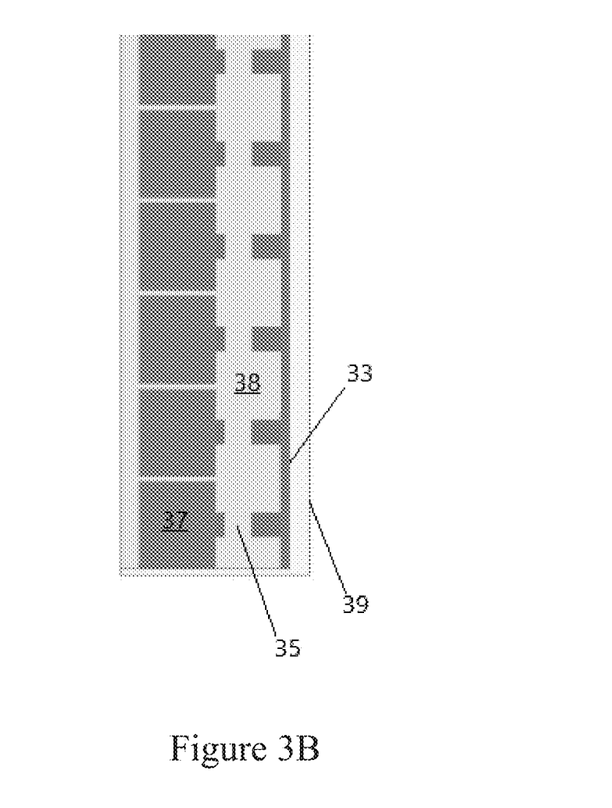
FIG. 3B is a top plan view of a backplane included in the display illustrated in FIG. 3A.

A display 30 according to a third embodiment of the present invention illustrated in FIGS. 3A and 3B similarly comprises a light-transmissive top protective sheet 32 that includes a continuous electrode, a layer of electro-optic medium 34, a light shielding layer 36, and a light emitter 31. The display 30 differs from the first and second embodiments in that the layer of photoconductive material 38 separates an array of electrodes 37 from a light-transmissive sheet 39. A non-conducting gap 35 is deliberately introduced between each electrode 37 and an associated address line 33.

To operate the display 30, a drive voltage of the desired polarity is applied across the address line 33 and the top electrode of the top protective sheet 32. However, if the light emitter 31 is off, the photoconductor 38 is in a high impedance state, and the current cannot cross the gap 35 between the address line 33 and electrode 37. When the light emitter 31 is on and light is directed to the photoconductive material 38 within the vicinity of the gap 35, the impedance of the photoconductor is sufficiently reduced to short the address line 33 to the electrode 37, thereby enabling an electric field to be applied to the electro-optic medium 34 between the shorted electrode 37 and the top conductor in the light-transmissive sheet 32.

Figures 4, 5:
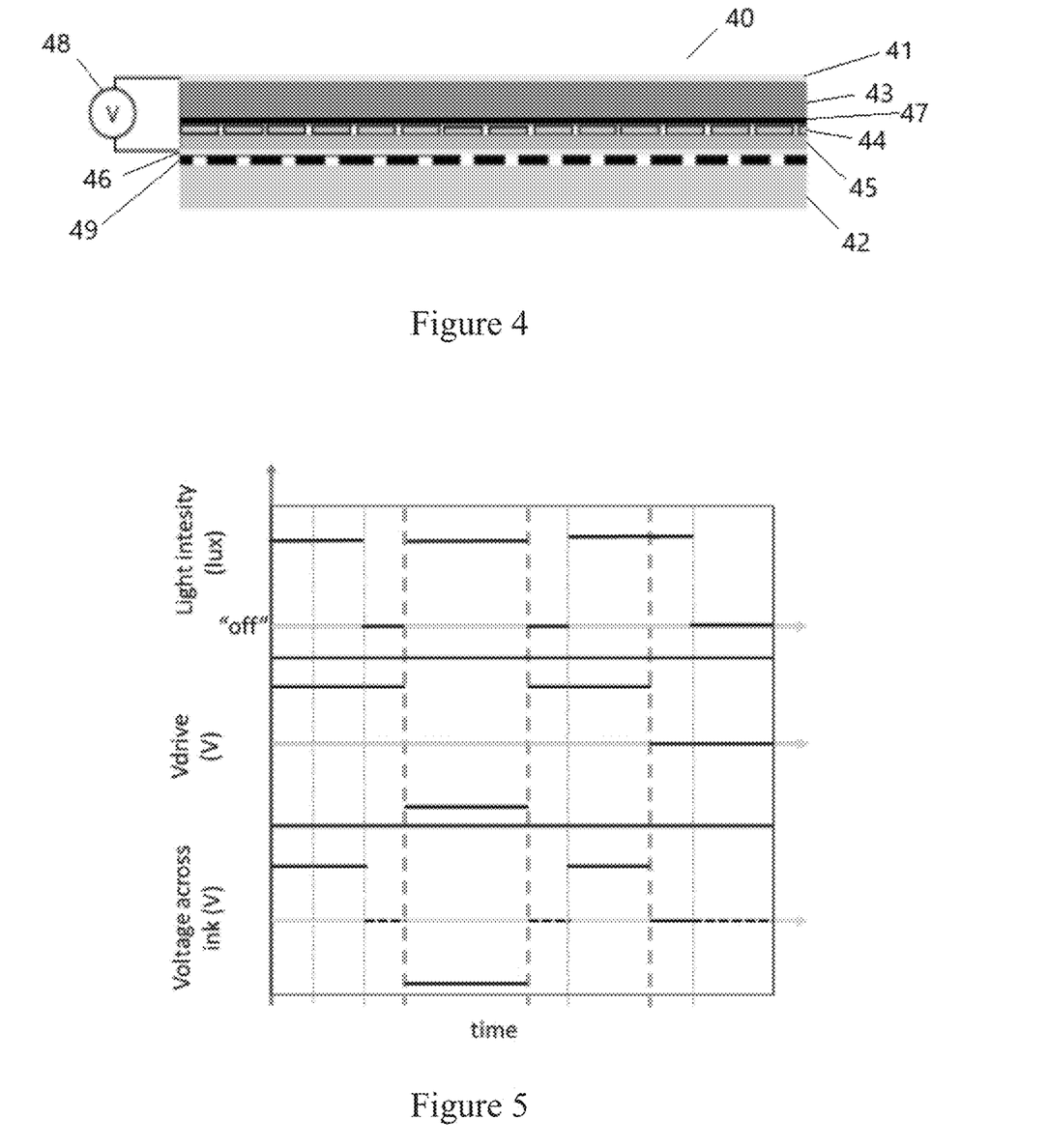
FIG. 4 is a schematic cross-sectional view of a display according to a fourth embodiment of the present invention.
FIG. 5 is a graphical representation of a first waveform applied to the display illustrated in FIG. 4.

In an alternative embodiment, the address line of display 30 may be replaced with a continuous electrode, such as the display 40 illustrated in FIG. 4. The display 40, similar to the previously described embodiments, comprises a top light-transmissive sheet 41 that includes a continuous electrode, a layer of electro-optic medium 43, light shielding layer 47, and light emitter 42. Below the light shielding layer 47 is an array of isolated electrodes 44, a layer of photoconductive material 45, and a second electrode layer 46 that may comprise a light-transmissive sheet with a layer of conductive material applied to the surface in contact with the photoconductive material. An optional light shielding pattern 49 may be applied between the light emitter 42 and the second electrode layer 46 in order to display an image corresponding to the pattern if the light emitter uniformly emits light from its surface. A driver 48 applies the desired voltage between the continuous electrode of the top sheet 41 and the second electrode layer 46 in order to switch the electro-optic medium 43, but only within the areas of the photoconductive material 45 with reduced impedance as a result of receiving light from the light emitter 42. Each of the electrodes within the array 44 serves as a pixel, and when no light is emitted by the light emitter 42, the pixel electrodes 44 are in a floating state.

Various methods may be employed for driving one or more pixels of an electro-optic display made according to the present invention through a transition from an initial optical state to a final optical state. The term "waveform" will be used to denote the entire voltage against time curve used to effect these transitions. Typically such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between optical states for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. It is also possible to use more than one drive scheme simultaneously in different areas of the same display.

The voltage applied by the driver (Vdrive) for any of the previously described embodiments can only be driven in a particular drive polarity, i.e. positive (Vpos), negative (Vneg), or neutral (0V), at a given time, and without a capacitor, the light emitter needs to be "on" during the duration of the drive. As previously explained, switching of the electro-optic medium requires coordination of the driver and the light emitter. Therefore, one driving method according to one embodiment of the present invention may appropriately set Vdrive (Vpos, 0, Vneg) and at the same time turn on the light of the light emitter for a desired period to affect the desired optical property of the electro-optic medium. FIG. 5 shows an example of this drive strategy applied to electrophoretic ink.

Figure 6:
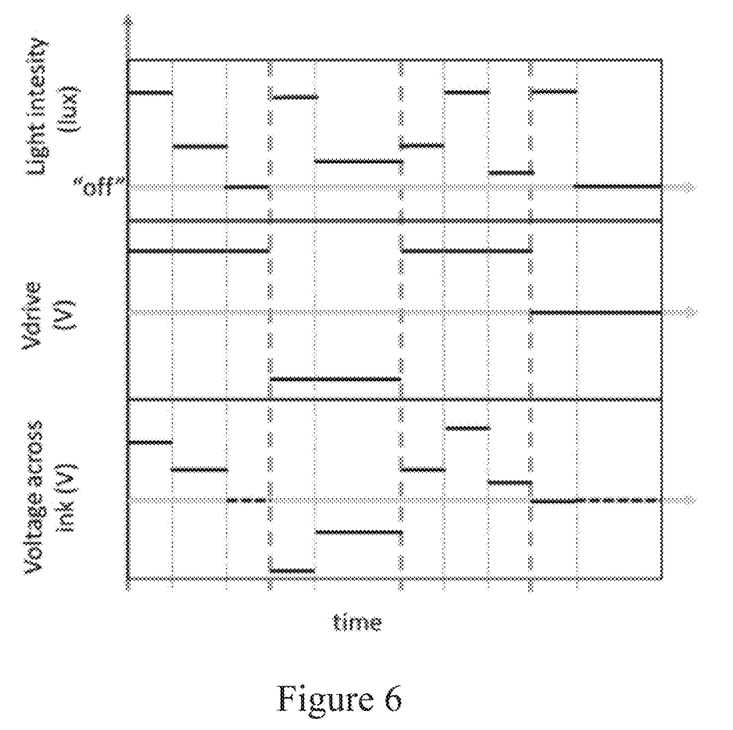
FIG. 6 is a graphical representation of a second waveform applied to the display illustrated in FIG. 4.

In an alternative method of driving a display according to any of the previously described embodiments, the intensity of light emitted by the light emitter may be adjusted to change the transconductance of the photoconductor and thereby modulate the voltage. For example referring to FIG. 6, despite maintaining the driver at a constant voltage (Vpos or Vneg) the applied voltage across the electrophoretic ink will be proportional to the light intensity emitted by the light emitter and transmitted through the photoconductive material.

The combination of the photoconductive material and variable light emitter enables simple modulated voltage without the need for gate/source drive complexity that is typically required for electro-optic displays that utilize active matrix backplanes. Furthermore, the maximum driving voltages needed to switch the optical states of the electro-optic media may be accomplished based on the appropriate selection and design of the light emitter and photoconductive material.

In preferred embodiments of the displays, the electro-optic medium is an encapsulated electrophoretic medium. Electrophoretic media typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

In several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. In one preferred form of such a process, the backplane is itself flexible and is prepared by printing the pixel electrodes and conductors on a plastic film or other flexible substrate. For the various embodiments of the present invention, a film of photoconductive material may be applied to the backplane prior to laminating the backplane to the substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

For the various embodiments of the present invention, it is preferred that the adhesive layer of the FPL form the light shielding layer. This may be accomplished for example, by incorporating a light absorbing pigment or dye that will effectively block a sufficient amount of light transmitted through the electro-optic medium. Care should be taken in selecting the appropriate pigments and/or dyes that will not substantially alter the electrical properties of the adhesive, which may affect the operation of the display.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Again, it is preferred that one of the adhesive layers is dyed to provide the light shielding layer. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate. A second layer of dyed adhesive may then be applied to the electro-optic layer to form a light shielding layer prior to being laminated to a layer of photoconductive material of a backplane. Such electro-optic displays can combine good resolution with good low temperature performance.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

EXPERIMENTAL EXAMPLES

Figure 7:
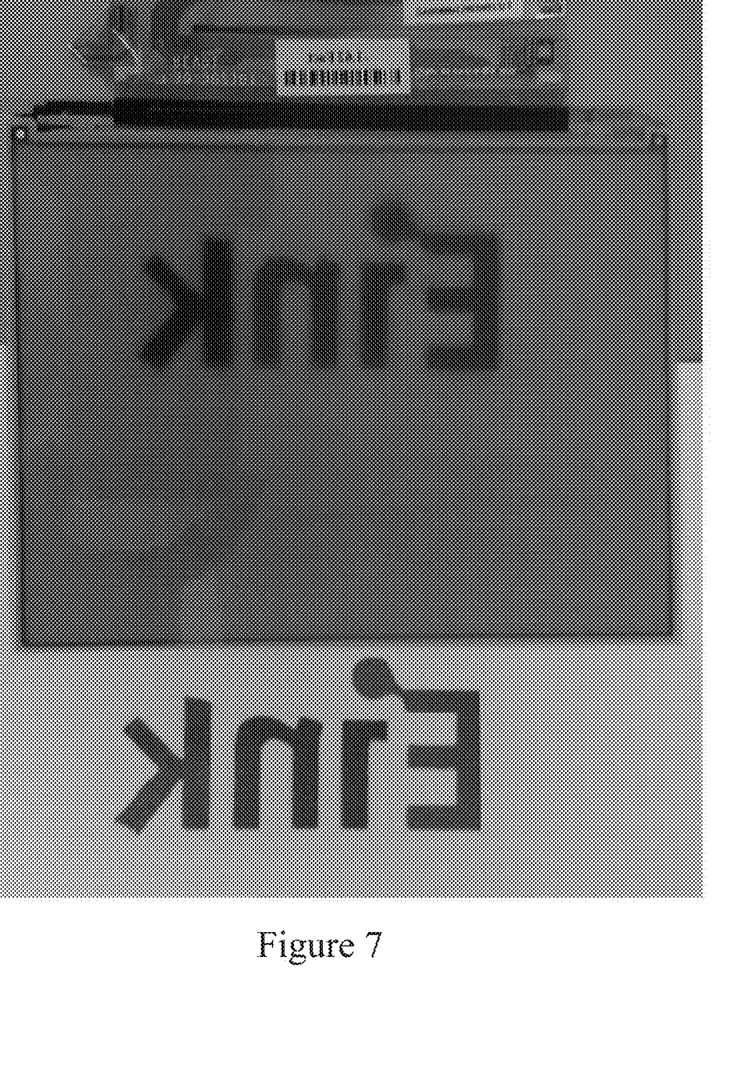
FIG. 7 is a photograph of an image formed on an AM-EPD device exposed to a bright source with a mask on the back.

A production standard AM-EPD with a glass backplane (E Ink Holdings, Billerica, Mass.) was masked on the back with printed paper and exposed to a bright light source. In order to image data on the mask, the AM-EPD was placed in "write-mode", the gate scan was stopped, all the gates were held to a negative voltage of about −15V, the source lines were grounded, and the Vcom was held at −15 V. FIG. 7 shows the image formed on the AM-EPD following light exposure from the back.

Figure 8:
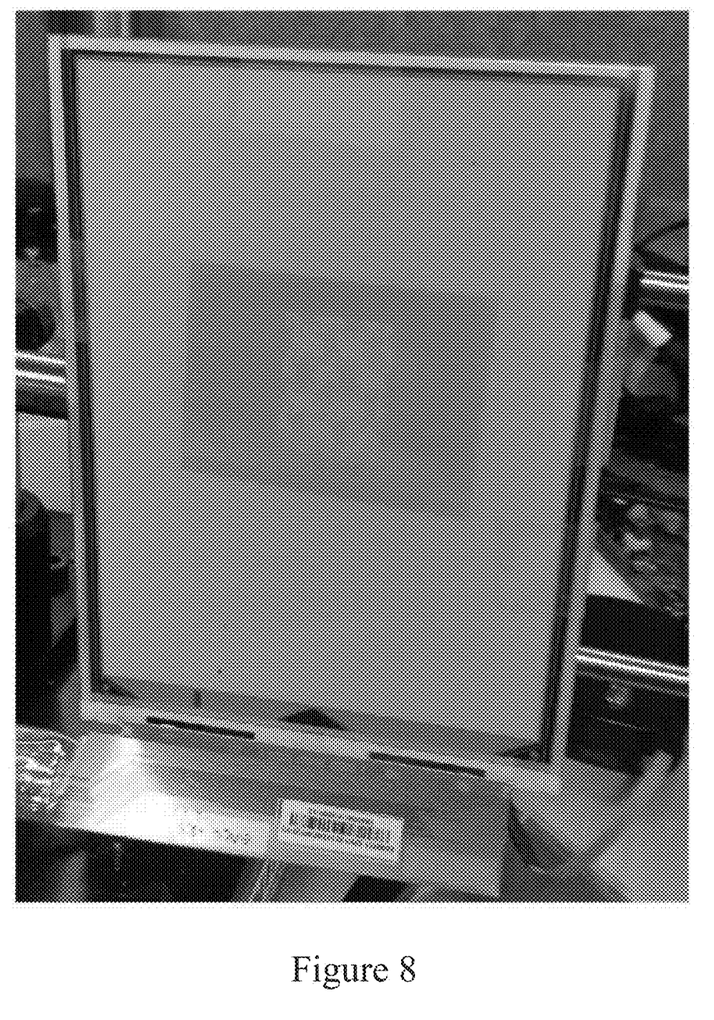
FIG. 8 is a photograph of an image formed on an AM-EPD device using a DLP projector that activated the TFTs of the AM-EPD from the back of the device.

In a second example, an Optoma Pico Projector (Texas Instruments, Dallas, Tex.) was used to project an image onto the back of a production standard AM-EPD with a glass backplane (E Ink Holdings, Billerica, Mass.). Again, the display was put into "write mode" as described in the first example. FIG. 8 shows the resulting imaging.

Figure 9A:
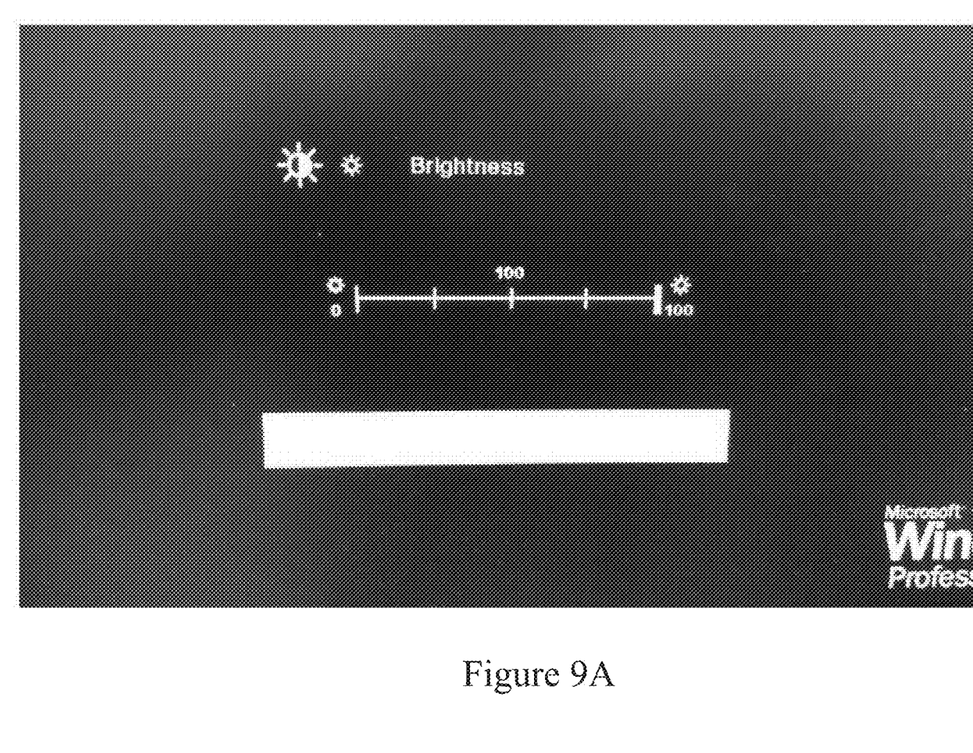
FIG. 9A is a photograph of a pattern imaged on an LCD display to drive an FPL placed above the LCD display.
Figure 9B:
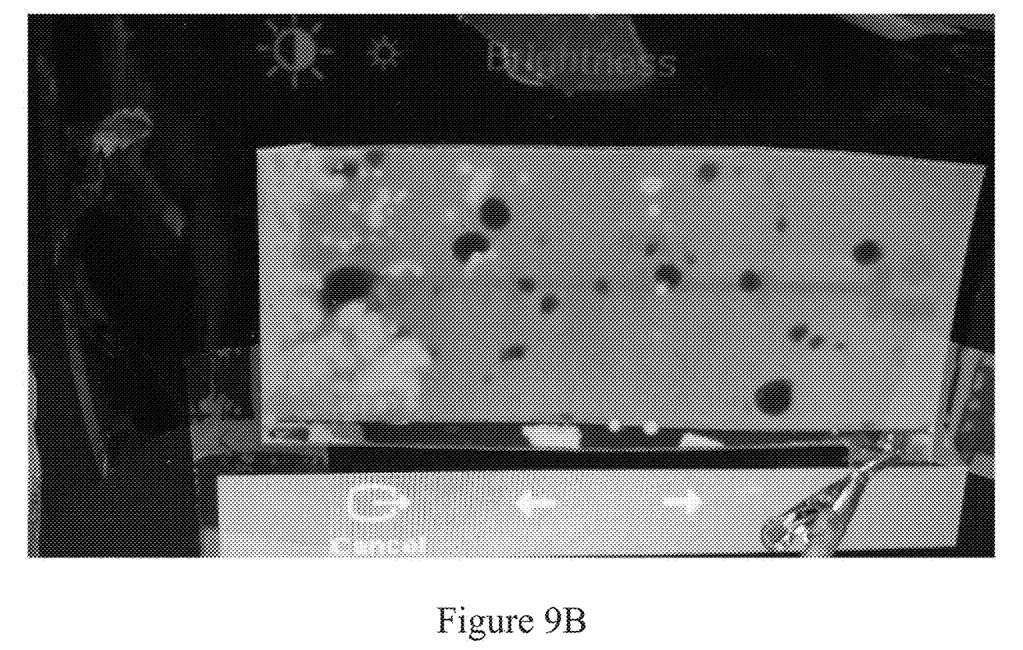
FIG. 9B is a sample of the image obtained on the FPL following illumination from the back with the LCD display and simultaneous application of a low voltage to the FPL.

In a third example, a photosensitive FPL of the type illustrated in FIG. 2 was placed over an LCD computer monitor and imaged the underlying pattern displayed on the LCD. In order to image the pattern, a voltage of about 15V was placed on the FPL while the LCD image was displayed from behind. FIG. 9A shows the pattern on the LCD and FIG. 9B captures the result image on the FPL.

All of the contents of the aforementioned patents and applications are incorporated by reference herein in their entireties. In the event of any inconsistency between the content of this application and any of the patents and application incorporated by reference herein, the content of this application shall control to the extent necessary to resolve such inconsistency.

We claim:

1. A method of driving an electro-optic display comprising:
    applying voltage between a light-transmissive layer of conductive material and one or more of a plurality of electrodes, wherein a layer of bistable electro-optic medium is disposed between the light-transmissive layer of conductive material and the one or more of a plurality of electrodes; and simultaneously emitting light from a light emitter of one or more light emitters onto at least a portion of a layer of photoconductive material that is disposed adjacent to the plurality of electrodes, wherein the plurality of electrodes are addressed with an address line and the layer of photoconductive material is adapted to bridge a gap between the address line and at least one of the electrodes when the photoconductive material is in a low impedance state.

2. The method of claim 1 wherein the electro-optic display further comprises:
 a second light-transmissive electrode layer between the layer of photoconductive material and the one or more light emitters; and
 a driver adapted to apply voltage between the light-transmissive layer of conductive material and the second light-transmissive electrode layer.

3. The method of claim 2 wherein the second light-transmissive electrode layer comprises a light-transmissive sheet and a layer of light-transmissive conductive material applied to the surface of the light-transmissive sheet.

4. The method of claim 2 wherein the electro-optic display further comprises a light-shielding pattern between the one or more light emitters and the second light-transmissive electrode layer.

5. The method of claim 1 further comprising applying a voltage between the light-transmissive layer of conductive material and a second light-transmissive electrode layer positioned between the layer of photoconductive material and the one or more light emitters of the electro-optic display.

6. The method of claim 1 wherein the electrodes of the plurality of electrodes are active matrix pixel electrodes or segmented electrodes.

7. The method of claim 1 wherein the light-transmissive layer of conductive material is between a protective sheet and the layer of bistable electro-optic medium of the electro-optic display.

8. The method of claim 1 wherein the layer of bistable electro-optic medium comprises an encapsulated electrophoretic medium.

9. The method of claim 8 wherein the encapsulated electrophoretic medium comprises a binder and a plurality of microcapsules, the microcapsules containing a dispersion of charged particles in a fluid.

10. The method of claim 8 wherein the encapsulated electrophoretic medium comprises a plurality of sealed microcells containing a dispersion of charged particles in a fluid.

11. The method of claim 8 wherein the encapsulated electrophoretic medium comprises a discontinuous phase comprising a plurality of fluid droplets containing charged particles and a continuous phase comprising a polymeric material.

\* \* \* \* \*